(12) United States Patent (10) Patent No.: US 7,627,809 B2
Balinsky (45) Date of Patent: Dec. 1, 2009

(54) DOCUMENT CREATION SYSTEM AND RELATED METHODS

(75) Inventor: Helen Balinsky, Cardiff (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 11/190,237

(22) Filed: Jul. 27, 2005

(65) Prior Publication Data

US 2006/0064630 A1 Mar. 23, 2006

(30) Foreign Application Priority Data

Sep. 18, 2004 (GB) ................................. 0420791.6

(51) Int. Cl.
*G06F 17/30* (2006.01)
(52) U.S. Cl. ........................ 715/200; 715/237; 707/100
(58) Field of Classification Search ................. 707/100, 707/102, 104.1; 715/500–515, 526–530, 715/200, 204, 207, 221–225, 237
See application file for complete search history.

(56) References Cited

U.S. PATENT DOCUMENTS

| | | | | |
|---|---|---|---|---|
| 5,634,064 | A * | 5/1997 | Warnock et al. | 715/513 |
| 5,860,074 | A * | 1/1999 | Rowe et al. | 715/526 |
| 5,956,738 | A | 9/1999 | Shirakawa | |
| 6,380,954 | B1 | 4/2002 | Gunther | |
| 6,415,306 | B2 | 7/2002 | Seaman | |
| 6,446,115 | B2 * | 9/2002 | Powers | 709/206 |
| 6,606,105 | B1 * | 8/2003 | Quartetti | 715/853 |
| 6,789,060 | B1 * | 9/2004 | Wolfe et al. | 704/235 |
| 6,993,527 | B1 * | 1/2006 | Raman et al. | 707/100 |
| 7,039,863 | B1 * | 5/2006 | Caro et al. | 715/530 |
| 7,062,497 | B2 * | 6/2006 | Hamburg et al. | 707/101 |
| 7,089,248 | B1 * | 8/2006 | King et al. | 707/10 |
| 7,249,318 | B1 * | 7/2007 | Corell et al. | 715/522 |
| 7,284,189 | B1 * | 10/2007 | Lawrence et al. | 715/234 |
| 7,299,972 | B2 * | 11/2007 | Kelley et al. | 235/375 |

FOREIGN PATENT DOCUMENTS

| | | |
|---|---|---|
| EP | 1503336 A2 | 2/2005 |
| GB | 2378340 A | 2/2003 |
| WO | WO 98/10356 | 3/1998 |
| WO | WO 01/39019 A2 | 5/2001 |
| WO | WO 02/37939 A2 | 5/2002 |
| WO | WO 02/084582 A2 | 10/2002 |

* cited by examiner

*Primary Examiner*—Cheryl Lewis

(57) ABSTRACT

A method of creating a document having a displayable area on which information is placed, the method comprising providing a plurality of content-items which contain information that it is possible to display on the displayable area, dividing the displayable area into a set of sub-areas each capable of receiving one or more of the content-items, generating at least one set of proposed arrangements in which the content-items have been arranged within the set of sub-areas, selecting at least one of the proposed arrangements, according to predetermine criteria, as the layout of the content-items within the sub-areas of the displayable area to create the document; and causing a printing means to print the created document.

23 Claims, 10 Drawing Sheets

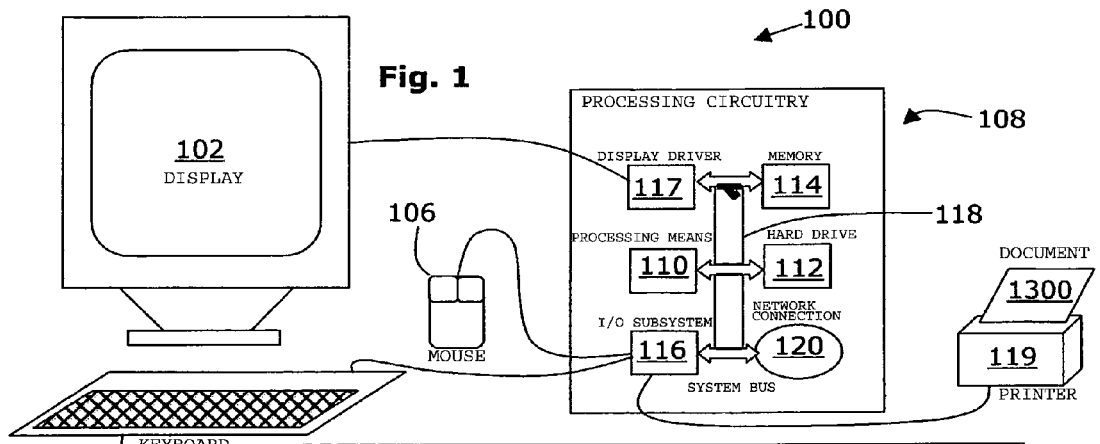
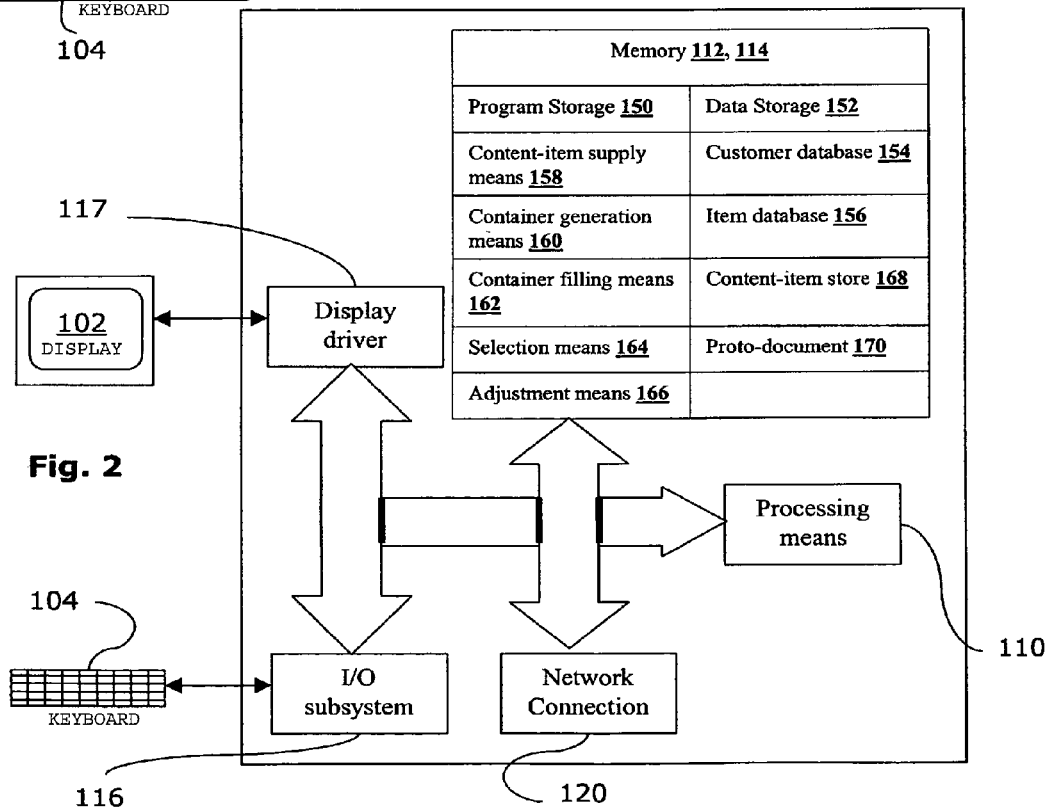

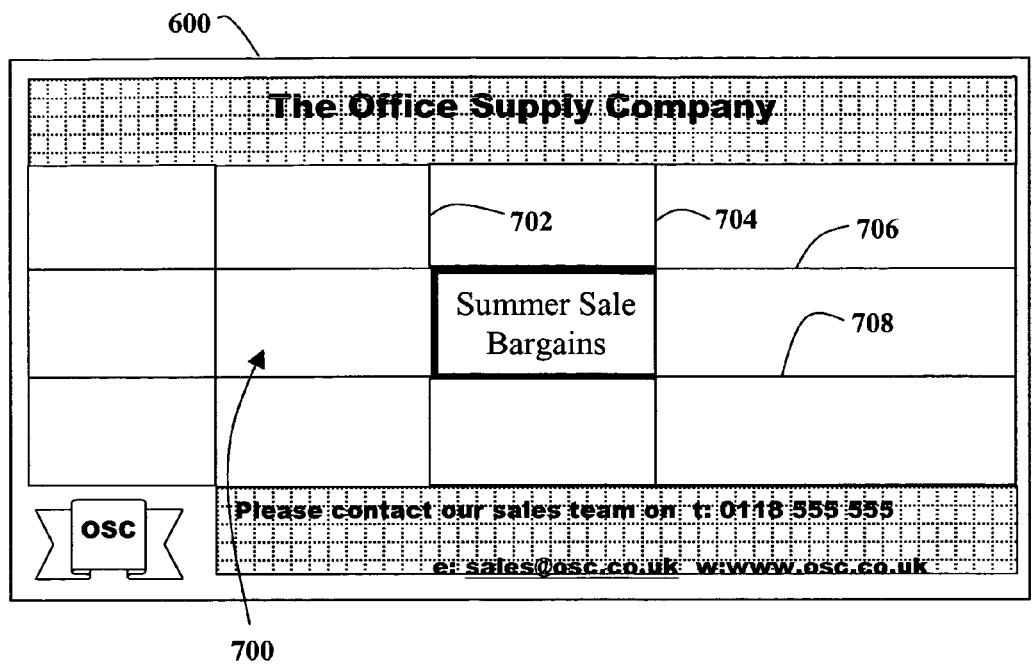
Fig. 7
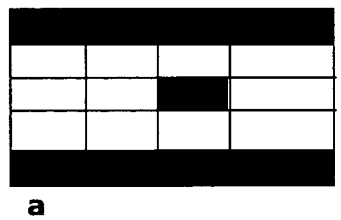
a
Fig. 8
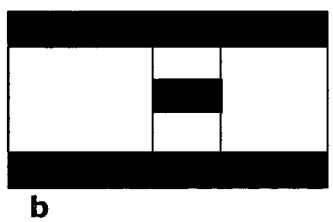 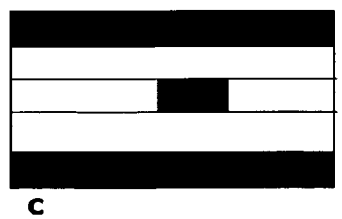 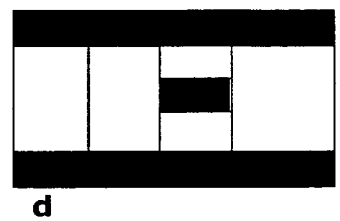
bcd
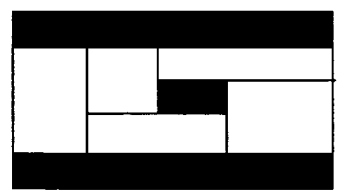 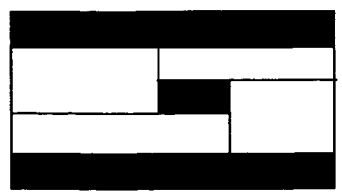 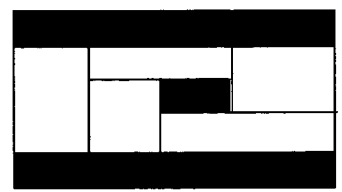
e  i=0f  i=1g  i=2

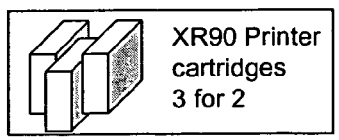
9a
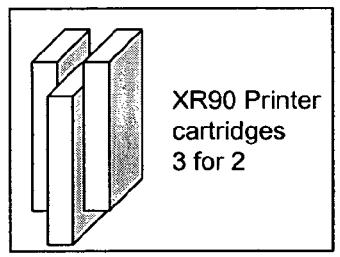
9b
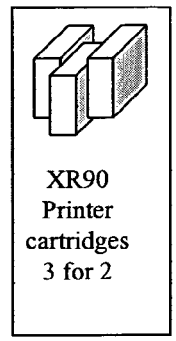
9c
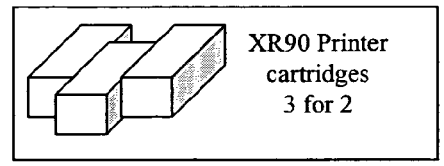
9d
Fig. 9
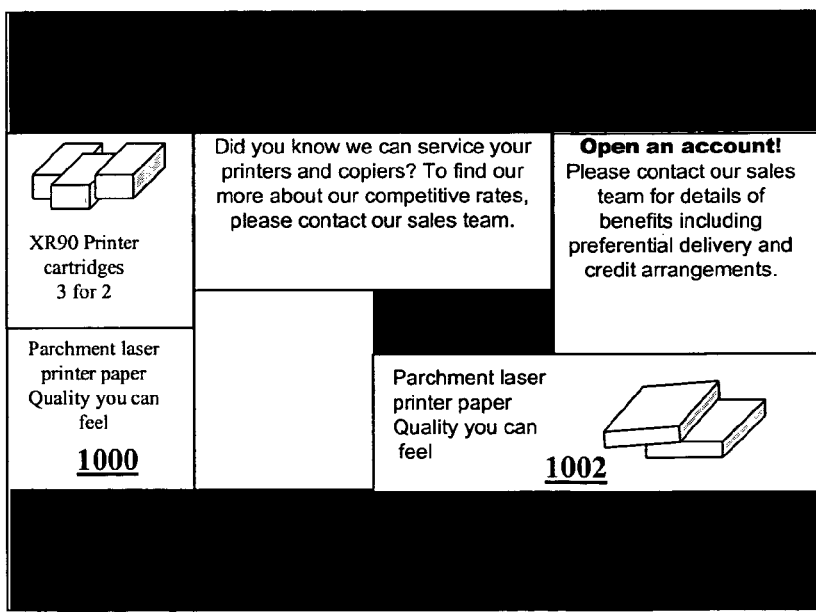
Fig. 10

1300

That is how the items appear for the "external" world of container packers

DOCUMENT CREATION SYSTEM AND RELATED METHODS

TECHNICAL FIELD

This invention relates to a document creation system and related methods. In particular, but not exclusively, the invention relates to customisation of printed documents.

BACKGROUND

With the advent of databases holding information about customer's, client's, etc. (hereinafter referred to as customer) preferences, purchases, past actions, and the like, it has become possible to generate targeted communications that are targeted specifically to a particular customer based upon the data held in the database. Such databases may be exemplified by so-called supermarket loyalty schemes. However, the skilled person will appreciate that such schemes are only one such example.

Such targeted communications may be thought of as more high value than communications that are sent en masse to a plurality of customers since they are targeted to a particular customer and are therefore perhaps more likely to be well received. However, in order that a targeted communication is well received it must be laid out correctly.

It will be appreciated that databases may comprise many thousands (and even tens or hundreds of thousands) of customers. It would be impossible to check, manually, that targeted communications sent to such a number of people conform to accepted presentation rules within reasonable time scales. As such the process should be advantageously performed automatically.

Readers of the communications are exposed to a large number of professionally published materials and consequently, have strong expectations of high quality documents. Thus, readers generally have an expectation that any communications they receive will be of a high quality.

Prior solutions are based on stochastic searches in unrestricted spaces. The objectives of these prior solutions tended to be the minimisation of wasted (i.e. empty) space and/or the elimination of overlaps between different objects. Such prior art does not address some of the concerns that arise in publishing; empty space is a rest area for the eyes of a reader and publications generally have an amount of such empty space. A typical holiday brochure may have roughly 20% empty space. The distribution of such empty space and its pattern is perhaps more relevant than the amount of such space.

Additional considerations arise if the targeted communication is a printed page such as a catalogue, pamphlet, letter, or the like. Unlike electronic documents such as web pages, emails, etc., a printed page has hard boundaries (i.e. no scrollbars) and for targeted communications continuation on the next page may generally be avoided.

SUMMARY

According to a first aspect of the present invention, there is provided a displayable area on which information is placed, the method comprising:

a. providing a plurality of content-items which contain information that it is possible to display on the displayable area;

b. dividing the displayable area into a set of sub-areas each capable of receiving one or more of the content-items;

c. generating at least one set of proposed arrangements in which the content-items have been arranged within the set of sub-areas;

d. selecting at least one of the proposed arrangements, according to predetermine criteria, as the layout of the content-items within the sub-areas of the displayable area to create the document; and e. causing a printing means to print the created document.

The processing circuitry may divide the displayable area into a set of sub-areas by any suitable method including any of the following non-exhaustive list: applying predetermined templates or by dividing the displayable area according to a set of predetermined rules.

According to a second aspect of the invention there is provided a document creation system arranged to create a document from displayable information, the system comprising a content-item supply means arranged to provide content items containing displayable information, a sub-area generation means arranged to divide a displayable area of the document into one or more sub-areas each capable of containing one or more content items to be displayed, a sub-area filling means arranged to place information within a sub-area to generate one or more proto-documents and a selection means arranged to select a proto-document as the layout for the document being created.

According to a third aspect of the invention there is provided a machine readable medium containing instructions which when read onto a computer cause that computer to perform the method of the first aspect of the invention.

According to a fourth aspect of the invention there is provided a machine readable medium containing instructions which when read onto a computer cause that computer to function as the document creation system of the second aspect of the invention.

The machine readable medium of the third or fourth aspects of the invention may be any one or more of the following: a floppy disk; a CDROM/RAM; a DVD ROM/RAM (including +R/RW, −R/RW); any form of magneto optical disk; a hard drive; a memory; a transmitted signal (including an internet download, file transfer, or the like); a wire; or any other form of medium.

DESCRIPTION OF THE DRAWINGS

An embodiment of the present invention is now described, by way of example only and with reference to the accompanying figures of which:

FIG. 1 shows a computer arranged to provide one embodiment of the present invention;

FIG. 2 shows detail of the memory of the computer system of FIG. 1;

FIGS. 5 to 12 show an example of how a document may be created using the processes described in the processes described in FIG. 3.

DETAILED DESCRIPTION

Figure 3:
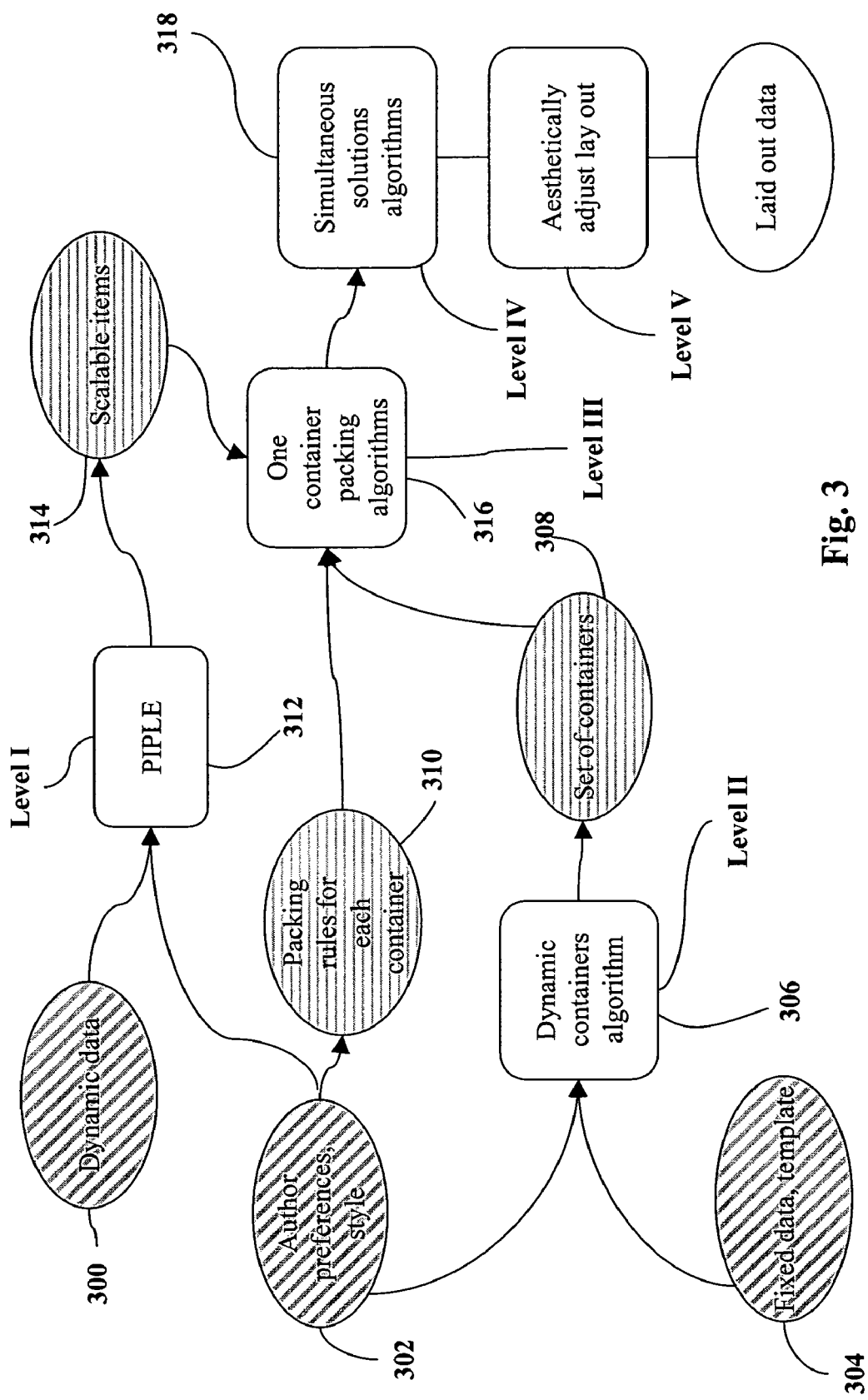
FIG. 3 shows an overall process diagram of the processes used in one embodiment of the present invention.

This particular invention may be used to automatically lay out communications, which are generally, but not exclusively, printed documents having a displayable area. For conciseness this method will hereinafter be described in relation to the creation of printed documents although it has wider applicability. The method may for example be applied to electronic documents such as emails, web pages, Adobe® PDF files and the like. Generally, the documents will be stored in an electronic form in an electronic memory.

The production of a document is a time consuming task which is made more time consuming if the document is to be customised to a specified reader. The document may for example be a holiday brochure, a store magazine, a catalogue, or the like, in which the contents is tailored according to the reader to whom the document will be sent or otherwise addressed.

FIG. 1 shows a computer 100 arranged to accept data and to process that data. The computer 100 comprises a display means 102, in this case an LCD (Liquid Crystal Display) monitor, a keyboard 104, a mouse 106 and processing circuitry 108. It will be appreciated that other display means such as LEP (Light Emitting Polymer), CRT (Cathode Ray Tube) displays, projectors, televisions and the like may be equally possible.

The processing circuitry 108 comprises a processing means 110, a hard drive 112 (containing a store of data), memory 114 (RAM and ROM), an I/O subsystem 116 and a display driver 117 which all communicate with one another, as is known in the art, via a system bus 118. The processing means 110 (often referred to as a processor) typically comprises at least one INTEL™ PENTIUM™ series processor, (although it is of course possible for other processors to be used) and performs calculations on data. The other processors may include processors such as the AMD™ ATHLON™, POWERPC™, DIGITAL™ ALPHA™, and the like.

The hard drive 112 is used as mass storage for programs and other data. The memory 114 is described in greater detail below and with reference to FIG. 2.

The keyboard 104 and the mouse 106 provide input means to the processing means 110. Other devices such as CDROMS, DVD ROMS, scanners, etc. could be coupled to the system bus 118 and allow for storage of data, communication with other computers over a network, etc. Any such devices may then comprise further input means.

The I/O (Input/Output) subsystem 116 is arranged to receive inputs from the keyboard 104 and from the processing means 110 and may allow communication from other external and/or internal devices. The display driver 117 allows the processing means 110 to display information on the display 102.

The processing circuitry 108 further comprises a transmitting/receiving means 120, which is arranged to allow the processing circuitry 108 to communicate with a network. The transmitting/receiving means 120 also communicates with the processing circuitry 108 via the bus 118.

The processing circuitry 108 could have the architecture known as a PC, originally based on the IBM™ specification, but could equally have other architectures. The processing circuitry 108 may be an APPLE™, or may be a RISC system, and may run a variety of operating systems (perhaps HP-UX, LINUX, UNIX, MICROSOFT™ NT, AIX™, or the like). The processing circuitry 108 may also be provided by devices such as Personal Digital Assistants (PDA's), mainframes, telephones, televisions, watches or the like.

The computer 100 also comprises a printer 119 which may be thought of as a printing means which connects to the I/O subsystem 116. The printer 119 is arranged to print documents 1300 therefrom.

FIG. 2 shows the memory 114 of the computer 100 of FIG. 1 in greater detail. It will be appreciated that although reference is made to a memory 114 it is possible that the memory could be provided by a variety of devices. For example, the memory may be provided by a cache memory, a RAM memory, a local mass storage device such as the hard disk 112, any of these connected to the processing circuitry 108 over a network connection such as via the transmitting/receiving means 120. However, the processing means 110 can access the memory via the system bus 118, accessing program code to instruct it what steps to perform and also to access the data. The processing means 110 then processes the data as outlined by the program code.

The memory 114 is used to hold instructions that are being executed, such as program code, etc., and contains a program storage portion 150 allocated to program storage. The program storage portion 150 is used to hold program code that can be used to cause the processing means 110 to perform predetermined actions. Although expanded upon hereinafter the program storage portion 150 comprises a content-item supply means 158, a container generation means 160, a container filling means 162, a selection means 164 and an adjustment means 166.

The memory 114 also comprises a data storage portion 152 allocated to holding data and in embodiments of the present invention in particular provides a customer database 154 and an item database 156. The customer database 154 contains data relating to customers preferences and the item database 156 contains information on that it may be desired to insert into the printed document that it being laid out. The data storage portion also contains a content-item store 168 and a store of proto-layouts 170.

Figure 4:
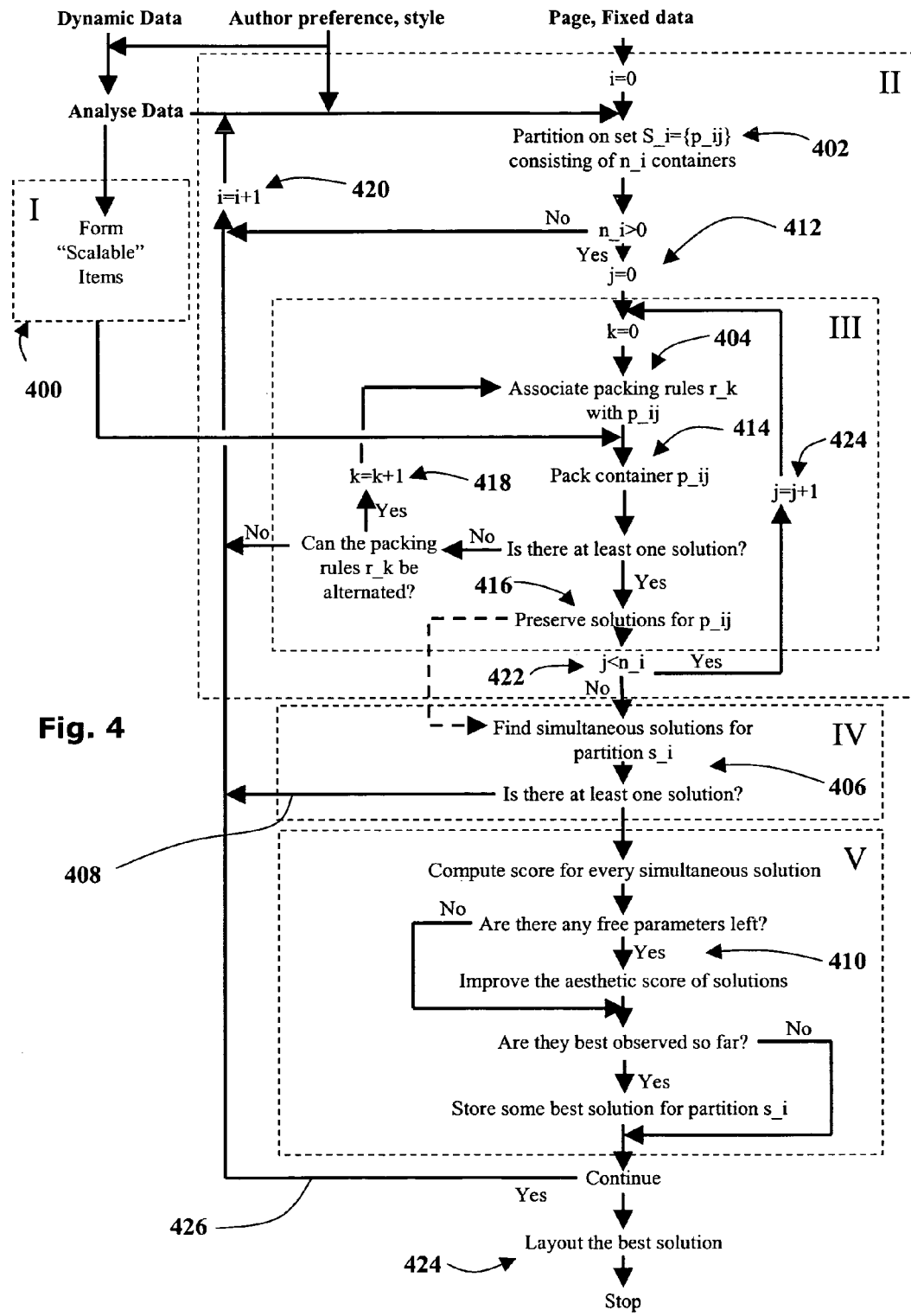
FIG. 4 shows a flowchart outlining steps to provide the processes outlined in FIG. 3.

The computer 100 described in FIGS. 1 and 2 is programmed to provide the method of laying out a document. Referring to FIGS. 3 and 4 it can be seen that the method may be thought of as creating the document using multiple levels of resolution. It starts by creating a high level structure of a document and continues by adding more details in successive steps. The preferred embodiment of the current invention can be described by five levels (levels I through V). However, in other embodiments these steps may be merged, sub-divided and/or simplified. The following description expands upon these levels. It will be seen that the author's preference, style and aesthetic rules are preferably taken into account in each level.

Level I of the Method.

In the embodiment being described the first step is to determine, for each printed document being laid out, which items from the item database 156 are to be inserted into the printed document. Each printed document being laid out has a target customer at which it is aimed. Thus, the customer database 154 is accessed for that customer and the data held therein is used to determine which items from item database 156 will be used. As the skilled person will appreciate the actual items to be used may be determined in any number of ways. For example, the customer database 154 may contain direct references to items in the item database 156. Alternatively, the items may be obtained from processing the data held in the customer database 154.

Each printed document being laid out comprises one or more content-items, each of which may relate to an item from the item database; which together form the content for that document. The content-items may comprise text, pictures (such as a photograph, line drawing, graph, or the like) or a combination of the two. These content-items may be formed in the first level, level I, of the method (step 400 of FIG. 4) from input data some of which is held in the item database 156. The input data may comprise any of the following: dynamic data 300 (held in the customer database 156), author preferences and style 302 (herein after referred to as style data) and fixed and static data 304 (herein after referred to as fixed data) which are combined to generate the content-items. One particular method for forming the content-items is described in patent application GB0416638.5 and similar techniques may be used herein. If the skilled person needs more information on this embodiment they are directed to read this document and the teachings are incorporated by reference herein.

In other embodiments the data storage portion 152 of the memory 112, 114 may contain content-items in a store 168 and in such embodiments level I of the method may not be performed; level I having been provided in a pre-processing step that has generated the content items for the store 168 thereof. In other embodiments the customer database 156 may contain data other than dynamic data.

The program storage portion 150 of the computer provides a content-item supply means 158 that is arranged to either generate the content items from data held in the item database 156 or to retrieve pre-generated content-items from the content-item store 168.

In the embodiment being described, each content-item comprises a plurality of fields which in this example comprise the following (this is not intended to be an exhaustive list and is provided by way of example only): a title, a reference, short and long descriptions, images, a price, features. It is possible that fields are empty and any such fields are assigned zero dimensions within the content-item.

When finally laid out in the printed document each content-item has an associated width, height and shape which is determined by the laying out process. Further, each content-item, in the finished document, will have a finalised appearance. However, during the lay-out process for the document parameters such as height of content-item, width of content-item, font colour, background colour, presence/absence of a border, or the like may be altered in order that the finished document has the desired appearance. The list of document parameters provided in this paragraph is not intended to be exhaustive and they are likely to be many more parameters associated with a content-item that may be altered during the laying out of the document.

Figure 5:
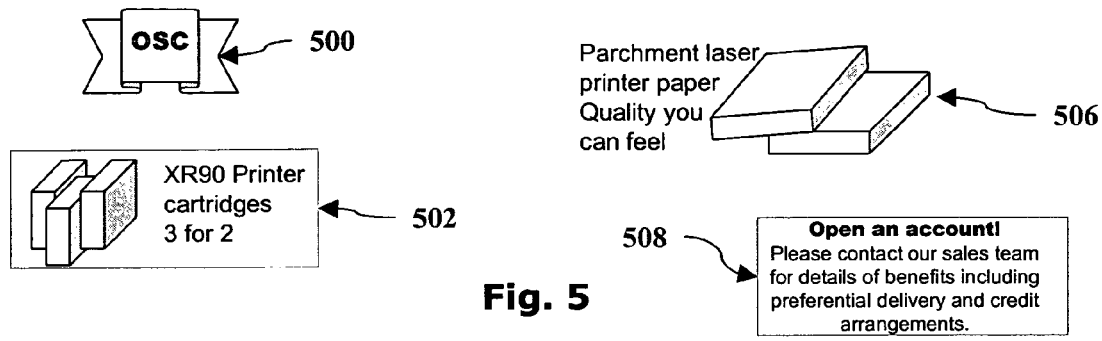

FIG. 5 shows examples of such content-items 500, 502, 504, 506, 508, 510. The content-item 500 comprises a purely graphic content-item in the form of a company logo. The content-items 502, 506 provide a combination of both text and graphics (in the case of both of these items a picture and text). The content-item 504 provides a content-item that is a combination of text and graphics (in this case a border together with text inside the border). The content-items 508, 510 comprise purely text.

Figure 14:
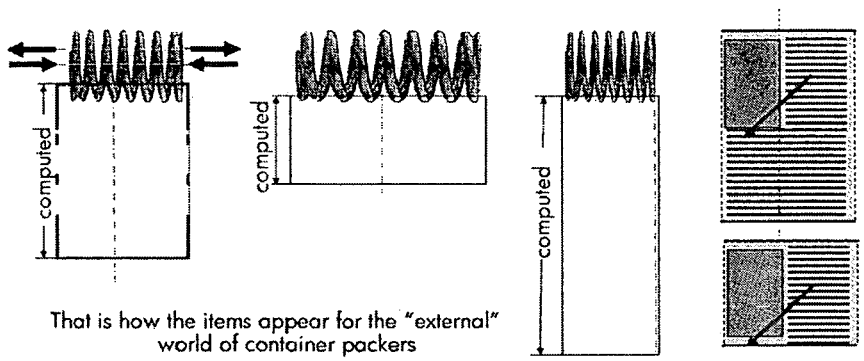

The content-items shown in FIG. 5 may be further processed in a step 312 (FIG. 3) which is further exemplified in FIG. 14. This step 312 allows the physical dimensions of the content-items to be varied in order that they can be fitted within containers. For example, if the width of the content-item is reduced then an associated length for the new width is calculated. There may be minimum and/or maximum heights/widths for a content-item. For example if the content-item comprises a picture then it may not be possible or desirable to change the dimensions of the picture and as such a minimum dimension may be set (e.g. minimum height in 1502). The output of this step is a set of scaleable items 314 which may be processed by packing algorithms. In some embodiments this step 312 may be called by later stages in order that content items may be re-sized.

This is further exemplified in FIG. 9 which shows how the content-item 502 of FIG. 5 might be varied according to the methods shown in FIG. 14. FIG. 9a shows the content element as it appeared in FIG. 5. FIG. 9b shows the same content element after it has been expanded vertically. FIG. 9c shows the same content element after it has been expanded vertically, but narrowed horizontally. FIG. 9d shows the same content element which has been expanded both horizontally and vertically. Thus, step 312 may be used to provide the content-items in a format that allows the dimensions to be altered; i.e. a set of scalable items 314. This format may subsequently be used by levels III to V to allow the content-item to be fitted to the document being constructed.

A document may comprise any number of such content-items. The number of pages, the size of the pages and the size of the content-items, the customer to which the printed document is targeted may all affect the number of content-items that a document will contain. The content-items selected for a document are selected for inclusion in that document according to predetermined criteria and the documents are generally created dynamically 'on the fly' using the selected content-items. As discussed above, it is possible for the content-items to be generated 'off-line' in what may be thought of as a pre-processing step.

The content-items 500-510 may be thought of as scaleable items since they may be re-sized and manipulated as described in the remaining Figures in levels II to V.

Level II of the Method.

Once the content-items have been created they are processed in the remaining levels in order to create the document. Level II (step 306 in FIG. 3) may be summarised as creating the general structure of the document which is added to and refined by the further levels. Generally this is performed by taking into consideration the style 302 and fixed 304 data and then remaining space is allocated to dynamic data 300. It is expected that the remaining space is to be non-rectangular non-convex domain with possible holes therein. The skilled person will appreciate that in a convex domain a straight line may be drawn between any two points in the domain without the line passing outside the domain. Therefore, it will also be appreciated that in a non-convex domain a line drawn between two points, each lying inside the domain, may lie, at least along parts of its length, outside the domain.

The two types of input data that are considered first (the style 302 and the fixed 304 data) generally specify that an item should be positioned at a predetermined position within the document. For example, a company logo may be provided at one or specified locations within the document (e.g. the bottom corner of every page). Page numbers may be required at one or more predetermined locations. A title may be required. It may be a requirement that what is deemed to be the most important/relevant item for a customer is to be placed at the focal point of a document (the point of the page that has the most impact and which is generally considered to be roughly two-thirds from the bottom to the top of a page in a central region thereof). It will be appreciated that there are many definitions as to the location of the focal point however they are roughly equivalent to two-thirds. For example, $5/7$ and $8/11$, amongst other distances, of the distance from the bottom of the page to the top of the page may sometimes be used as the position of the focal point. Other examples are equally possible.

Figure 6:
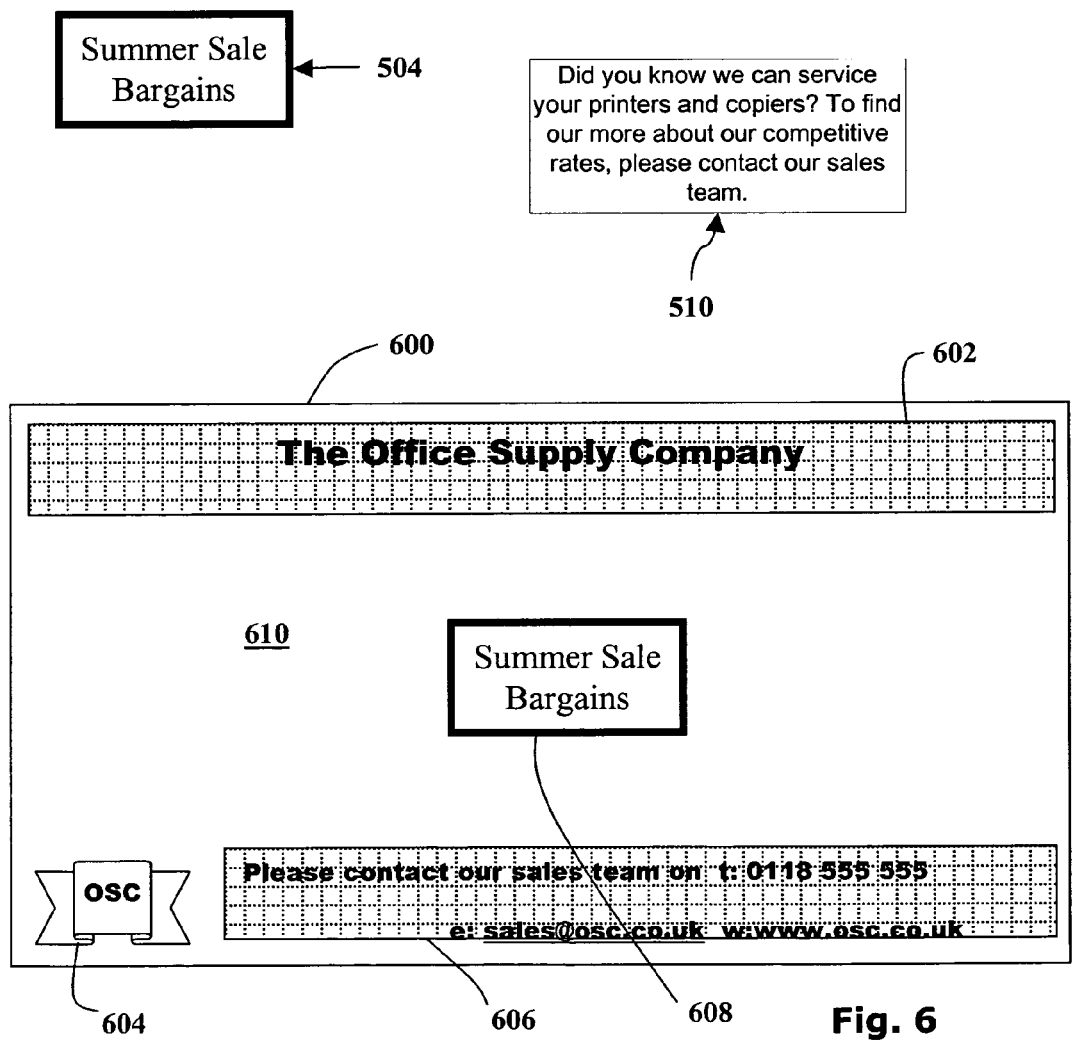

FIG. 6 shows an example proto-document 600 (i.e. a document that is under construction) which has had the style 302 and the fixed 304 data applied thereto. It will be seen that there is a title bar 602 across a top region of the document, a company logo 604 in a bottom left corner, an address bar 606 across a bottom region and a 'summer sale bargains' box 608 in a central region of the document (near to the focal point of the page). The remaining, un-used, space 610 is then free for dynamic data which will be drawn from the item database 154 and specified for each customer.

In summary therefore, generally, the presence and dimensions of fixed content-items may be unknown until run-time. At the same time these content-items may claim certain fixed positions on a page. Once the style 302 and fixed 304 data has been placed a non-rectangular area, often with holes therein (caused by style 302 and fixed 304 data) is left into which the dynamic data is to be fitted. The area remaining for the dynamic data (the remaining space) is processed by a container generation means 160 to generate one or more containers into which content items may be placed.

In perhaps the simplest embodiment the style 302 and the fixed 304 data are placed within a fixed template (sometimes referred to as a hard template). In such an embodiment the remaining space may also be specified by the template.

Such a template for the remaining space may have variable portions which are adjusted to allow the dynamic data to be placed therein. For example an area of width w may be specified in the template as having three columns each of width w/3. Thus, the width is not fixed but may be varied according to the space left after the style 302 and fixed 304 data has been placed. Such templates may be thought of as soft templates since its dimensions may be altered during the lay-out of the document. Of course, such soft templates may also be specified as having variable heights (i.e. height/x where x is a number), or any other, or combination of, suitable dimensions varied.

The templates, whether hard or soft, may therefore provide a set of containers into which content-items may be placed.

In perhaps preferred embodiments, a set of containers are defined by the relationship with page boundaries and other fixed objects. Using a set of containers based on such relationships is advantageous because it allows minor alterations in page dimensions to be taken into consideration which would otherwise need a soft, or hard template re-working. In one embodiment the method described in patent application number GB0416642.7 is used to position the data on the document. If the skilled person needs more information on this embodiment they are directed to read this document and the teachings are incorporated by reference herein. The containers may be thought of as a set of sub-areas of the displayable area provided by the document.

Thus, the containers into which content-items may be placed may be provided by the three techniques described above (hard templates, soft templates, or calculated based upon the relationship with page boundaries and other fixed objects). There may be other possibilities and this list is not intended to be exhaustive.

A brief summary of the method of generating the containers based upon the relationship with page boundaries and other fixed objects now follows with reference to FIGS. 7 and 8. The un-used space 610 is divided into sections according to edges that occur in the proto-document 600—generally due to the style 302 and fixed 304 data placed therein. This divided document can be seen in FIG. 7; it will be seen that a dividing line is created from every edge that occurs in the style 302 or fixed 304 data creating a grid like arrangement 700 in the un-used space 610. Examples of such edges are the boundaries of the 'summer sale bargains' box 608 which cause the lines 702, 704, 706, 708 to be created. Similar lines are created from the other style 302 and fixed 304 data. Embodiments in which the edges within a document are used to specify the containers are thought to be advantageous because they help to enforce alignment of text, images, etc. within a document. Such alignment is a principle of aesthetics that can be used to improve the look of a document.

So called containers into which the content-items created in level I of the method (and/or in a pre-processing step) are then created by merging elements of the grid arrangement 700 (step 402 of FIG. 4). It will be appreciated that many different containers may be created by merging different elements of the grid arrangement 700. Examples of some of the many different containers are shown in FIGS. 8b to 8g. The style 302 and fixed data 304 are represented by the blackened regions of these Figures. The method then assesses the proposed containers and rejects those that it is deemed are unsuitable. Unsuitability may be judged by various factors including the one of more of the containers having unsuitable dimensions, etc. In the examples given in FIG. 8, FIGS. 8b to 8d are rejected and the examples shown in FIGS. 8e to 8f are each judged to provide a set of suitable containers (with reference to FIG. 4 the set of containers shown in FIG. 8a may provide set of containers i=0, the set of containers shown in FIG. 8b may provide set of containers i=1 and the set of containers shown in FIG. 8c may provide set of containers i=2).

Thus the output from level II 306 of the method is a set of containers 308 into which the content-items may be fitted. The remaining steps of the method (III, IV and V fit content-items into these sets of containers. Generally, there is no set order in which the content-items are placed into the containers and in embodiments that have no order the lay-out of each document is thus highly customisable). Indeed, the layout may be further altered by varying the set of containers that is used to hold the content-items.

Level III of the Method.

Now that at least one set of containers has been proposed (three set of containers are shown in FIGS. 8e to 8g) and also a set of content-items 500-510 the method fills the containers with the content-items in level III of the method. The program storage portion 150 provides a container filling means 162 to perform this level of the method. In the embodiment being described and before level III is applied one or more packing rules is preferably associated with every allocated container using style, user preference and possible preliminary analysis of a dynamic data (in step 310 of FIG. 3 and step 404 of FIG. 4).

Possible packing rules include any of the following non-exhaustive list: setting a minimal and/or a maximal amount of white space per container; setting the border and/or background properties of a container; one or two dimensional packing (i.e. whether the container can have rows and columns of content-items, just a column or just a row); specifying what types of data (e.g. whether text, graphics, or mixed, etc.) a container may hold. The rules may specify the physical arrangements of the container and may for example specify any of the following non-exhaustive list: the size of the margins of the container, the density to which the container may be packed, the contrast between the container and the content-items, the colour of the content-items, and the like.

It will be appreciated that there will be many methods of determining which content-items will be placed in which containers. Suitable methods are fully described in patent application numbers GB0416641.9, and GB0317303.6. If the skilled person needs more information on this aspect they are directed to read these documents and the teachings are incorporated by reference herein. In general the content-items are placed within the containers according to the dynamic content in the content-items, style and user preferences. Further, each container will generally contain more than one content-item.

Figure 13:
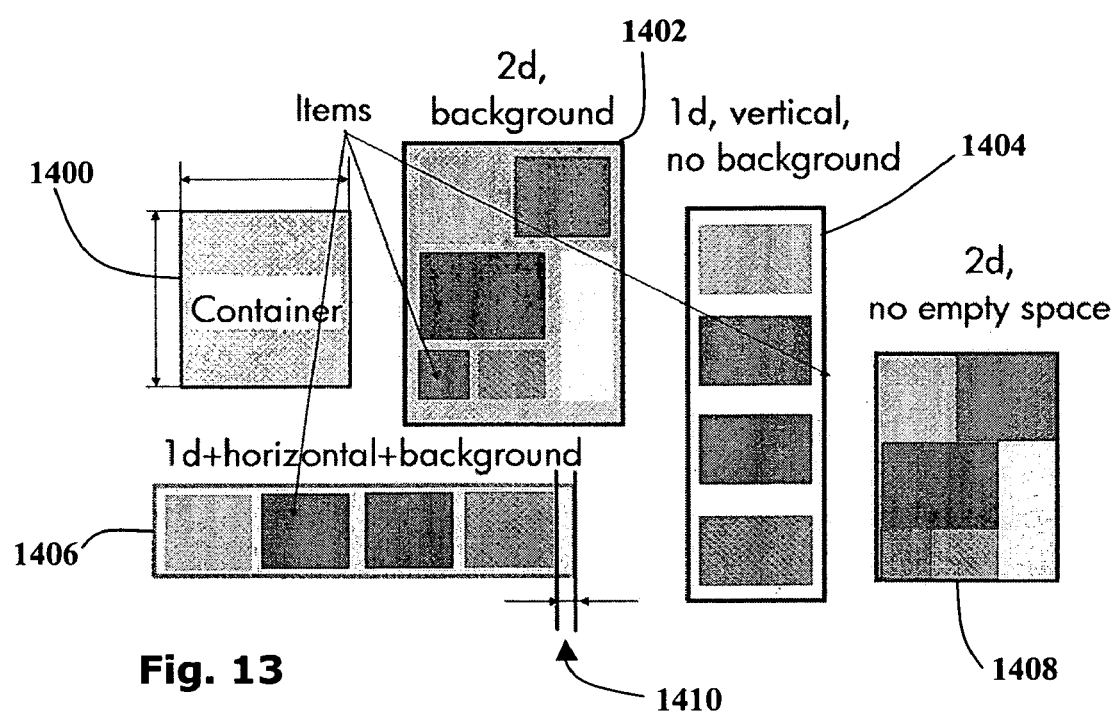
FIGS. 13 to 17 each show an example of one of the processes outlined in FIG. 11.

Example packing rules are shown in FIG. 13 (step 310 of FIG. 3). There will be a number of ways of fitting the content-items into each container 1400. For example, the content-items could be fitted in a 2D arrangement 1402, 1408, in a 1D vertical arrangement 1404 or in a 1D horizontal arrangement 1406. A background may be provided 1402, 1406 or no background may be used 1404. Indeed, in other examples no space may be provided between content-items within a container 1408. Further, the widths between the content-items may be varied (see for example 1410). Such a step allows content-items to be combined together in an allocated container.

At this stage every content-item can be placed in every container (unless such a placement would be rejected by one of the rules developed in step 310 of FIG. 3). Level III (step 316 of FIG. 4) may then be applied to find separate solutions for each container according to associated rules for the set of containers 308 produced by level II. The solutions generated in this step of level III may be thought of as a set of solutions for each container and subsequent steps may be used to determine which solution from the set is to be used for the document. This step allows exceptions to be determined: for example, a container may be too small, dynamic data may be too coarse, a container may have a dark background but there may be no data with a suitable contrast to allow it to be used with such a background. If such exceptions are determined then one or more sets of containers may be excluded from further processing and the processing continued on other sets of containers.

Thus, in step 316 of FIG. 3 the set of containers 308, the packing rules 310, and the scaleable items 314 are processed in order to determine how the containers 308 should be packed.

Figure 15:
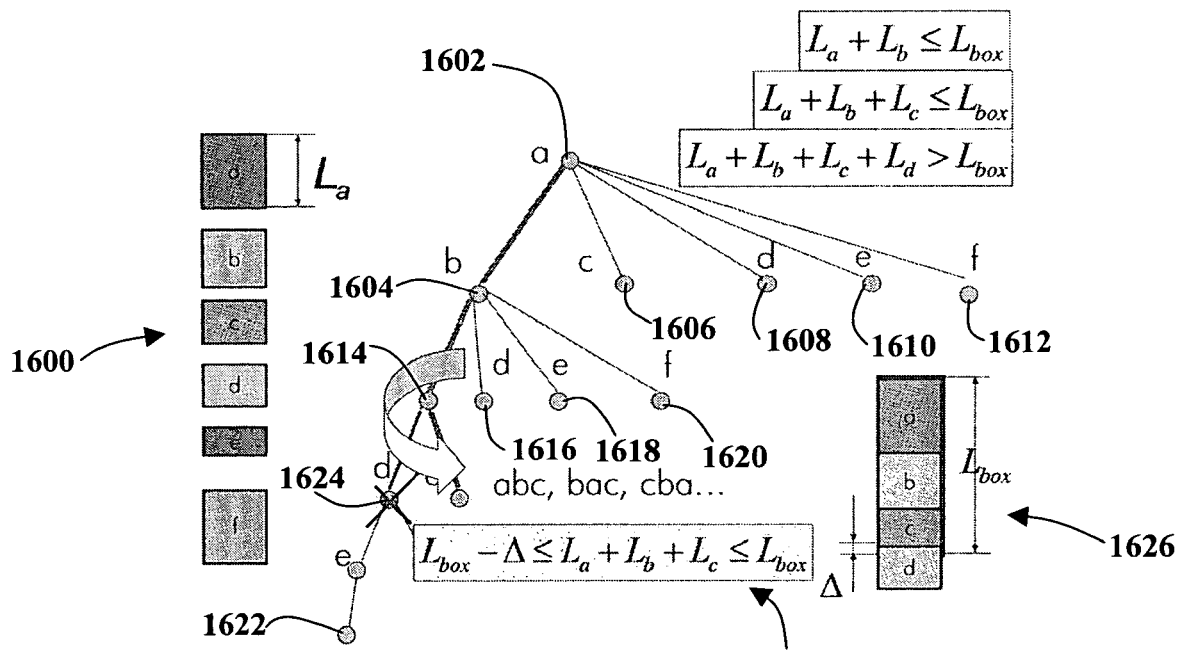

As shown in FIG. 15 one possible packing strategy is provided by a smart tree search in which a tree is expanded in order to determine various packings. FIG. 15 shows how the smart tree search may be applied to determine if six content-items (a, b, c, d, e and f) may be fit into a container having a vertical height of L. Blocks 1600 providing examples of the content-items are shown to the left of the Figure. A tree is then formed by the algorithm with each node of the tree having expanded therefrom the containers below that node. Therefore, node 1602 representing 'a' has nodes 1604, 1606, 1608, 1610 and 1612 expanded therefrom respectively representing content-items 'b', 'c', 'd', 'e' and 'f'. Node 1604 (representing content-item 'b') has four nodes 1614, 1616, 1618 and 1620 respectively representing content-items 'c', 'd', 'e' and 'f'. This pattern continues until node 1622 is reached which represents content-item 'f'. A similar expansion occurs from the nodes 1606, 1608 and 1610. It will be appreciated that because there are no blocks below 'f', node 1612 has no children and therefore is the last node in the rightmost branch.

The smart tree search algorithm may then be used to determine which arrangements of the content-items may validly fill the container being assessed. The assessment made at node 1604 is:

$$L_a+L_b \leq L_{box}$$

That is the length of containers a and b totals less than the length of the container (i.e. the box) and thus a and b together may be a solution to filling the container being assessed.

The assessment made at node 1614 is:

$$L_a+L_b+L_c < L_{box}$$

Again, the assessment shows that the total length of content-items a, b and c is less than that of the container so that the three items (in any order) may be a solution to filling the container in question.

However, the assessment made at a node 1624 is:

$$L_a+L_b+L_c+L_d > L_{box}$$

That is the length of content-items a, b, c and d is longer than the container and thus the four content-items (taken in any order) will not fit the container. This is exemplified to the right of the Figure at 1626.

Some embodiments may make a further assessment at each node to determine whether the solution in question leaves too much space within the container. If this is the case then the particular solution may also be rejected. An example of the rule is shown at 1628. $\Delta$ is taken to be the amount of allowable free space within a container and as such an assessment may be made at each node to see if there is too much space in a particular solution. It will be appreciated that it can be undesirable to have too much free space. Thus the assessment made at node 1614 if such an assessment were being made would be:

$$L_{box}-\Delta \leq L_a+L_b+L_c \leq L_{box}$$

Once the left most branch has been expanded the remaining branches are subsequently expanded. For example the branch passing through node 1606 is expanded next, followed by the branch through node 1608, the branch through node 1610 and finally the branch consisting of nodes 1602 and 1612.

It will be appreciated that this smart search algorithm may be termed a depth first search strategy. It would be equally possible to apply other search strategies—for example a breadth first strategy, or assess all of the nodes in the tree, or the like.

A similar algorithm is explained in explanation of such a method is described in patent application GB0317303.6 mentioned above. If the skilled person needs more information on this aspect they are directed to read this document and the teachings are incorporated by reference herein.

Figure 16:
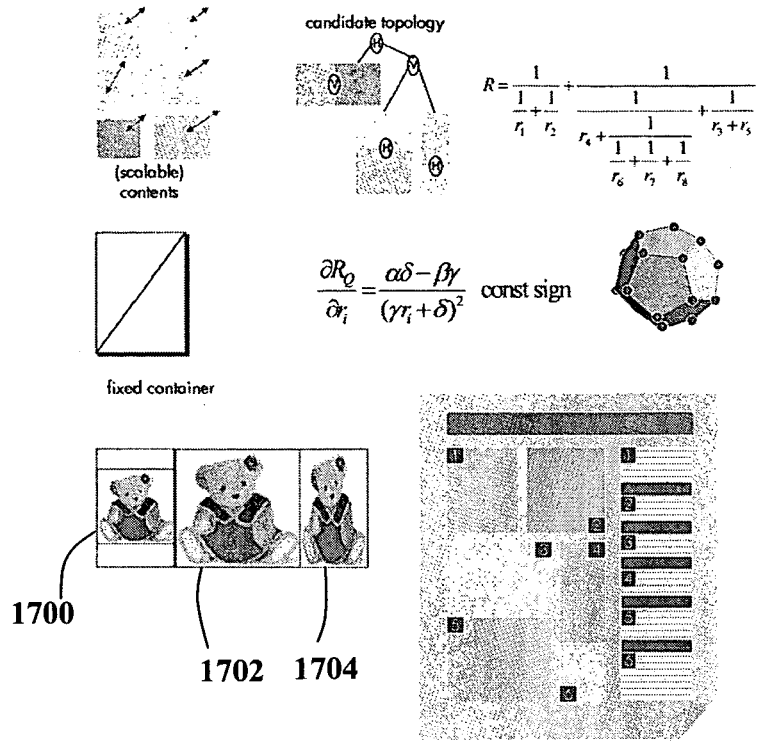

An alternative, or additional method, for this step is shown in FIG. 16. This method allows the aspect ratios of the content-items to be varied within constraints in order that they may be fitted within the containers. The method may or may not allow scaling of images. However, in the preferred embodiment text provided by the content-items is assumed to be of fixed size and the method determines how images may be scaled in order to fill the remaining space. Thus looking at the Figure and as will be appreciated by the skilled person an image may have its size altered by keeping its aspect ratio fixed and also by having its aspect ratio varied. The picture of the bear 1700 is shown to have been expanded with aspect ratio constant in 1702 and with the aspect ratio varied as in 1704. In embodiments in which techniques shown in FIG. 16 are used the text may be initially placed into one or more containers from the content-items and remaining space may then be filled with pictures. The method may determine whether or not scaling and/or cropping of the image prior to placing in the container is appropriate. The method may or may not allow the cropping of images. Patent application GB416641.9 shows a method in which similar techniques to those shown in FIG. 16 are provided. If the skilled person needs more information on this aspect they are directed to read this document and the teachings are incorporated by reference herein.

Further, the method may allow the text and images from a content-item to be separated from one another. In such embodiments the text may be placed into a first container and the image placed into a second container. In such embodiments the method may provide mechanisms for linking the text and the image and/or rules as to which images and text may be separated.

There may be other methods for determining solutions to fitting the content-items within the containers.

The techniques exemplified in FIGS. 15 and 16 are used with the sets of containers shown in FIGS. 8e, 8f and 8g together with the content-items of FIG. 5 (which may be manipulated by the methods of FIG. 9) to produce proposed arrangements for a layout of the content-items for the document. Each of containers within a set of containers will generally contain more than one content-item.

One possible embodiment of determining how the sets of containers should be packed is discussed in relation to FIG. 4 and within this Figure variable i identifies the set of containers that is being processed, variable j identifies the container number and variable k identifies the rule number. Thus initially (i.e. at region 412) j and k are set to zero and the first set of containers (i=0) is processed. The first container (for p_ij initially with i=0, j=0) is processed and packing rules that have been determined for that container are used (step 404). An attempt is then made to pack this container 414. If a solution is obtained for packing the container p_ij then that solution is preserved 416. If there is no solution then an alternative set of packing rules is tried (if possible) by incrementing the rule that is being processed 418. If this is not possible (because there are no alternative rule sets) then the set of containers being processed is incremented 420 (i=i+1) and there are no solutions for the current set of containers.

Next an assessment is made as to whether there are further sets of containers to be processed 422. If there are then j is incremented 424 and the packing rules are assessed for the next container as described above.

The looping (408, 418, 424) described in FIG. 4 may cease as soon as one possible arrangement of content-items within the set of containers has been located. In alternative embodiments the looping (408, 418, 424) may be exhaustive and may continue until all sets of containers have been considered. In alternative embodiments looping may continue until a predetermined number of solutions have been located (assuming that this number of solutions exist)—for example the looping may continue until 2, 3, 4, 5, 6, 7, 10, 15, etc. solutions have been located.

Thus, although FIG. 10 shows one possible solution for the layout of the proto-document 1001 the current method may be used to generate a plurality of such solutions. In alternative embodiments the loops shown in FIG. 4 may terminate once a satisfactory solution has been found rather than continuing until the packing rules (k) and containers (j) have been exhaustively tested.

Figure 11:
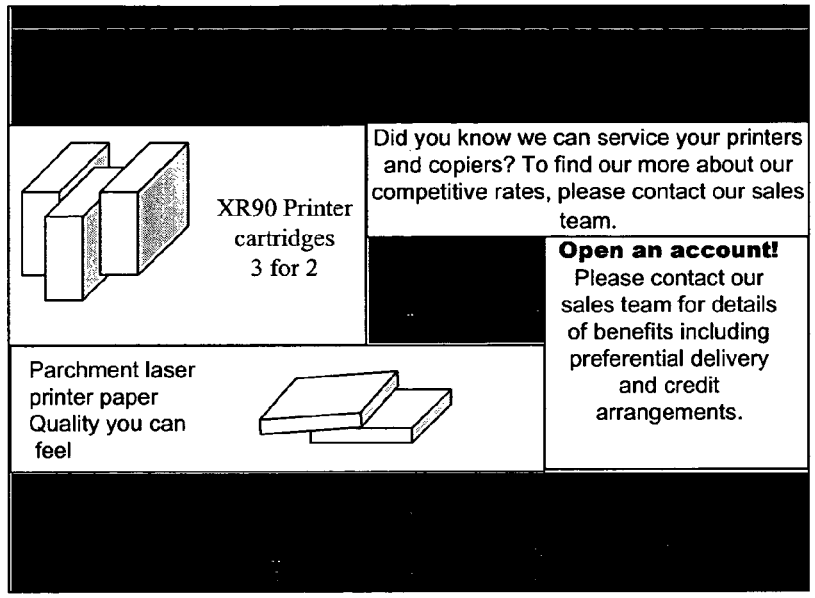
Figure 12:

It will be seen that the example shown in FIG. 10 uses the set of containers of FIG. 8g. However, it will also be seen that containers 1000 and 1002 have both been packed with a portion of the content-item 506. Thus, the particular example shown in FIG. 10 is not a satisfactory solution to laying out of the content-items on the document. Further, although it would be possible for a container within a set of containers to contain a single content-item (as generally shown in FIGS. 10, 11 and 12) it would be more usual if a container were to contain a plurality of content-items. An example of this is shown in container 1000 of FIG. 10 in which two content-items have been packed into the left-most container.

In some embodiments of the invention it is possible that the content-items may be split and each part of the split content-item may be placed by the methods outlined in level III. For example a content-item may be split so that an image is handled separately from text within the content-item.

Level IV of the Method.

Thus, Level IV of the method (as outlined in step 318 of FIG. 3 and 406 of FIG. 4) processes each of the solutions proposed by level III of the method to ensure that i. there are no repeated content-items, ii. all compulsory data is used and iii. if there are split items that both parts of any such item are placed. For most situations a set of simultaneous solutions will be found.

Figure 17:
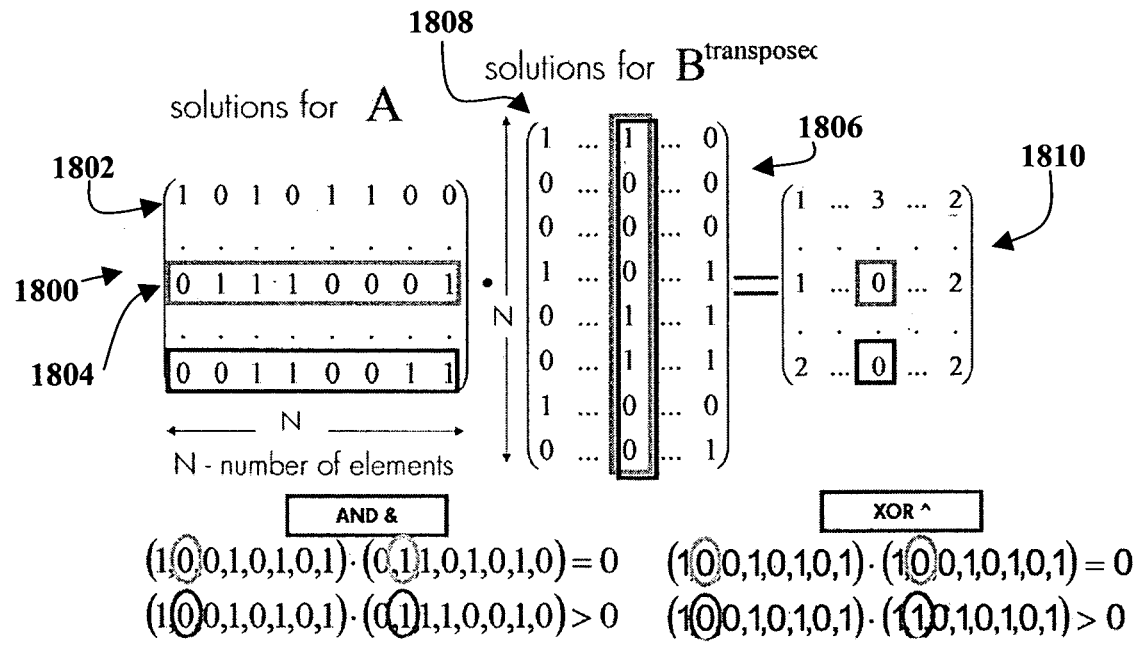

One particular method for determining whether simultaneous solutions exist is shown in FIG. 17. In this method a matrix is used to represent possible solutions for a container. Thus in FIG. 17 a row of matrix A 1800 represents a possible arrangement of content-items within container A. For example the first row 1802 of matrix A 1800 shows that there are eight content-items (represented by eight columns) that have been considered for fitting into container A. Of these eight items, item numbers 1, 3, 5 and 6 are a possible solution for filling the container. The second row 1804 shows a further possible solution to packing matrix A in which item numbers 2, 3, 4 and 8 fill the container.

Matrix B 1806 shows a similar construction for a set of content-items within a container B but the matrix has been transposed. Therefore, the first column 1808 shows that item numbers 1, 4 and 7 are a possible solution to filling container B.

Multiplying the two matrixes together gives the answer shown in the Figure by the answer matrix 1810. A zero in the answer matrix 1810 identifies that the row and the column used to produce that zero are possible solutions and do not contain a simultaneous solution. A number greater than zero identifies that there is a conflict between the solutions proposed in row of matrix A and in the column of matrix B. If the content-items comprise both text and associated images then it may be appropriate to use matrix multiplication operator AND, However, if the content-items have separated from one another (i.e. the text and associated images have been separated from one another) then it may be appropriate to use the matrix multiplication operator XOR. A similar method is described in patent application number GB0416641.9. If the skilled person needs more information on this aspect they are directed to read this document and the teachings are incorporated by reference herein.

In this embodiment, once simultaneous solutions have been excluded, each of the solutions proposed by level IV is scored in order that the solution that should be used can be identified. Such scoring may be defined according to a set of predetermined rules and in this embodiment is assessed for each of the content-items. Of course, alternative embodiments may simply select the first solution that is proposed; randomly, pseudo-randomly, etc. select a proposed solution; or any other suitable selection criteria. However, the program storage portion 150 provides a selection means 164 that is arranged to perform this selection.

If level IV determines that there are no solutions proposed then it will be seen that the method may loop back to the beginning (408 in FIG. 4) and the parameter i is increased by one such that the next set of containers is processed—the method having failed to find a layout for the current set of containers If the embodiment of the invention allows content-items to be split (for example splitting the text away from the image, or splitting images away from one another, dividing text, or the like) it is then level IV of the invention preferably checks to see if the split content-items have been handled correctly. For example, an assessment may be made as to whether the image from a content-item has been provided without the text of the content-item. It is likely that different embodiment will have different rules for what is acceptable. For example, some embodiments may allow the text of a content-item to be provided without the image. Alternatively, or additionally, embodiments may not allow the image to be placed without the associated text also being placed. Other embodiments may apply the inverse of these rules.

The possible solutions to the layout of the content-items is output by level IV into level V. Level V is arranged to assess each of the solutions and to ascertain whether the score assigned to a solution can be improved 410; it may be thought of as adjusting the layout to improve the aesthetics. The program storage portion 150 comprises an adjustment means 166 that is arranged to make such adjustments. In this embodiment such improvements of a solution are made by assessing whether a proposed solution has any free parameters which may be amended. Such free parameters may include any of the following non-exhaustive list of options: the position/order of content-items within a container; emphasis applied to any one content-item; whether or not the proposed layout is symmetrical and the like.

Level V of the Method.

It will be appreciated that the field of graphic design has a number of rules as to what makes a design aesthetically appealing or not. These rules may take into consideration the intended use of the document; for example if the document is a business report then it is likely to have different considerations compared to if it were a poster advertising a sale of goods. Level V of the method may be thought of as applying such aesthetical rules to try and improve the solutions proposed in Level III and checked in Level IV.

One possible method of making such improvements to a solution may be made by considering what can be termed a saliency map of the layout. Such a saliency map provides a map of the document that highlights areas on which a viewer would concentrate their attention. Predetermined rules may be constructed that define features such as: how close areas of high impact should be placed next to one another; how many points of high impact should be placed on page; whether the areas of high impact should be symmetrical and the like. Similar methods are described in patent application filed on the Feb. 9, 2004 as GB0416640.1. If the skilled person needs more information on this aspect they are directed to read this document and the teachings are incorporated by reference herein.

As a result of this analysis content-items may be made more salient, or less salient. Factors that can be used to alter the saliency of a content-item include placing/removing a border from the item; removing/adding a background colour to the item; changing the font colour of the item; making the shape of the item non-regular (for example placing a star shaped border around the item) or making it regular (for example removing an irregular border). This list is not intended to be exhaustive and there may be other ways of altering the saliency of a content-item.

Another method of making such improvements to a solution is to consider the symmetry within the document and either increase the symmetry or decrease the symmetry depending upon the effect that is desired. An example of such a method is shown in patent application GB0317300.2. If the skilled person needs more information on this aspect they are directed to read this document and the teachings are incorporated by reference herein.

Level V finally selects the solution with the highest score and takes this to be the layout for the document being created. If layouts are required for further documents then the process repeats 426 until a layout has been proposed for each of the documents for which it is desired to have a layout. Otherwise the process stops and a solution should have been provided for each of the documents for which a layout was required 424.

An example of the proposed layout for the document being developed through FIGS. 5 to 12 can be seen in FIG. 11. It will be seen that this has used the set of containers proposed by FIG. 8f. FIG. 12 shows the document of FIG. 11 having style 302 and fixed 304 data shown thereon. It will be appreciated that the document shown in FIGS. 11 and 12 is a simplification of the documents that would generally be provided.

Thus some embodiments of the invention provide a multi level solution built by obeying rules, which may be aesthetical rules, rather than searching huge spaces to find solutions where desired rules are observed. Many embodiments start by creating a high level structure of a document and continue by adding more and more details in successive steps. Author's preferences, style and aesthetic rules may be taken into account at each of the levels of the method. Using the rules, which may be style and/or aesthetic rules, the overall layout problem may be partitioned into a chain of sub-problems with a relatively small search sub-spaces. This creates the possibility for checking every possible solution from a desired class (if required) and selecting the best. Alternatively, the search for a solution may be terminated once a single solution has been found.

Thus some embodiments of the present invention may provide the following advantages. Embodiments are more likely to be more efficient at finding a solution for the layout of the information when compared to prior art solutions such as those based upon layout problems. Since there is increased efficiency the processing power required for the processing circuitry is reduced and/or the time taken to find a satisfactory solution is reduced.

Further, because the method is based upon a set of known method steps (rather than the stochastic methods of the prior art) then it is possible to cause the processing circuitry to produce diagnostic data. Embodiments producing such diagnostic data are advantageous because they can allow the method steps to be adjusted to try and improve the method.

The invention claimed is:

1. A method of creating a document having a displayable area on which information is placed, the method comprising:
    a. providing a plurality of content-items which contain information that it is possible to display on the displayable area;
    b. dividing the displayable area into a set of sub-areas each capable of receiving one or more of the content-items;
    c. generating at least one set of proposed arrangements in which the content-items have been arranged within the set of sub-areas;
    d. selecting at least one of the proposed arrangements, according to predetermined criteria, as the layout of the content-items within the sub-areas of the displayable area to create the document; and
    e. causing a printing means to print the created document.

2. A method according to claim 1 in which the steps are performed in the order shown.

3. A method according to claim 1 in which the content-items are generated from information that it is desired to display on the document.

4. A method according to claim 1 in which the content-items are provided as scalable items which are capable of being re-sized.

5. A method according to claim 1 in which steps c to e are performed iteratively until the method fails or until a layout of the content-items is selected.

6. A method according to claim 1 which is arranged to place information that should be placed at a predetermined location within the document before placing other information.

7. A method according to claim 1 in which the processing circuitry divides the displayable area into a set of sub-areas by any of the following: selecting a predetermined template; dividing the displayable area according to a one or more predetermined rules.

8. A method according to claim 1 which is arranged to place information that should be placed at a predetermined location within the document before placing other information in which the processing circuitry divides the displayable area into a set of sub-areas by any of the following: selecting a predetermined template; dividing the displayable area according to a one or more predetermined rules and in which the sub-areas are created after the information that is required to be placed at a predetermined location within the document has been placed.

9. A method according to claim 1 in which step e. of the method assigns a score according to predetermined scoring criteria to one or more of the proposed arrangements.

10. A method according to claim 9 which selects the proposed arrangement having the highest score as the layout of the content-items on the displayable area.

11. A method according to claim 1 in which step d. of the method adds proposed arrangements to the set of proposed arrangements if that proposed arrangement provides a possible solution to the layout of the information on the displayable area.

12. A method according to claim 11 in which the method does not generate further proposed arrangements once a single proposed arrangement has been generated and added to the set of proposed arrangements.

13. A method according to claim 1 in which the method further comprises the step of adjusting the appearance of one or more content-items in order to adjust the appearance of the document.

14. A method according to claim 13 in which the adjustment of the content-items occurs between steps d and e of the method.

15. A computer readable storage medium containing instructions which when read by a computer cause that computer to perform the method of claim 1.

16. A computer readable storage medium containing instructions which when read be a computer cause that computer to function as the document creation system of claim 1.

17. A document creation system arranged to create a document from displayable information, the system comprising a content-item supply means arranged to provide content items containing displayable information, a sub-area generation means arranged to divide a displayable area of the document into one or more sub-areas each capable of containing one or more content items to be displayed, a sub-area filling means arranged to place information within a sub-area to generate a plurality of proto-documents and a selection means arranged to select a proto-document as the layout for the document being created.

18. A system according to claim 17 in which the content-item supply means comprises a store of data in which the content items are stored such that they can subsequently be retrieved therefrom.

19. A system according to claim 17 in which the sub-area filling means is arranged to provide a plurality of proto-layouts from which the selection means is arranged to select a preferred layout.

20. A system according to claim 17 which further comprises an adjustment means arranged to alter parameters associated with a proto-document in order to adjust the appearance of the document provided by the proto-document.

21. A system according to claim 20 in which the adjustment means is arranged to adjust the proto-document selected by the selection means.

22. A program arranged to cause a computer to create a document from displayable information accessible thereby, the program being arranged to cause the computer to access a supply of content items containing displayable information, to generate a plurality of sub-areas from a displayable area, each of the sub-areas being capable of containing one or more content items, to place information within a sub area to generate a plurality of proto-documents and subsequently to cause the computer to select, according to predetermined criteria, a proto-document as the layout for the document being created.

23. A computer readable storage medium containing instructions providing the program of claim 22.

* * * * *